F. D. CLEVELAND.
MACHINE FOR HANDLING AND FLAKING FISH.
APPLICATION FILED NOV. 15, 1911.

1,036,567.

Patented Aug. 27, 1912.

3 SHEETS—SHEET 1.

F. D. CLEVELAND.
MACHINE FOR HANDLING AND FLAKING FISH.
APPLICATION FILED NOV. 15, 1911.

1,036,567.

Patented Aug. 27, 1912.
3 SHEETS—SHEET 2.

F. D. CLEVELAND.
MACHINE FOR HANDLING AND FLAKING FISH.
APPLICATION FILED NOV. 15, 1911.
1,036,567.
Patented Aug. 27, 1912.
3 SHEETS—SHEET 3.
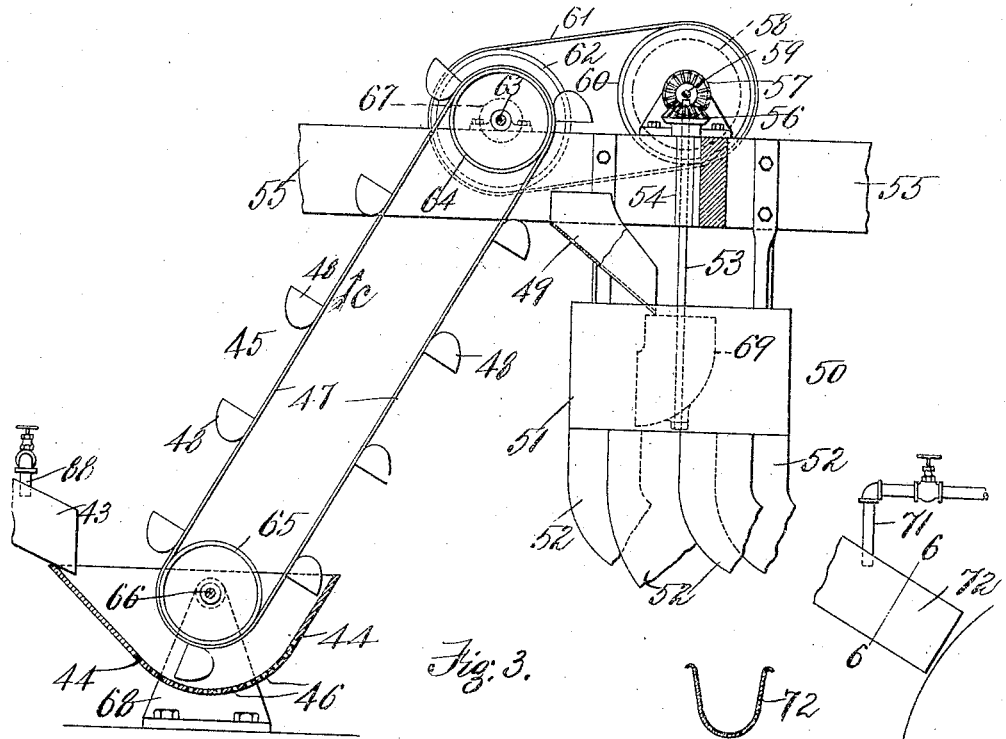
Fig. 3.
Fig. 6.
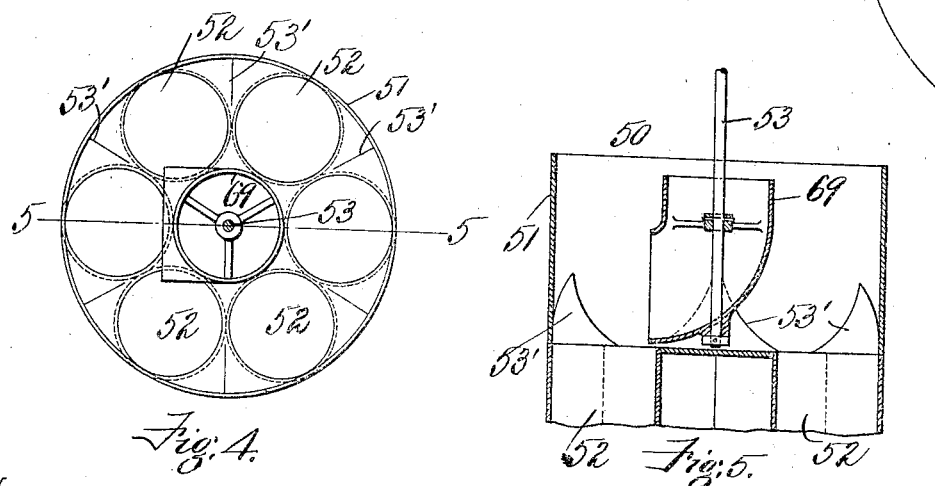
Fig. 4.
Fig. 5.
WITNESSES
John P. Aitchison
Leonard A. Powell
INVENTOR
Francis D. Cleveland,
by his attorney Charles V. Gooding.

UNITED STATES PATENT OFFICE.

FRANCIS D. CLEVELAND, OF WINCHESTER, MASSACHUSETTS.

MACHINE FOR HANDLING AND FLAKING FISH.

1,036,567.

Specification of Letters Patent.  Patented Aug. 27, 1912.

Application filed November 15, 1911. Serial No. 660,486.

*To all whom it may concern:*

Be it known that I, FRANCIS D. CLEVELAND, a citizen of the United States, residing at Winchester, in the county of Middlesex and State of Massachusetts, have invented new and useful Improvements in Machines for Handling and Flaking Fish, of which the following is a specification.

This invention relates to a machine for handling and flaking fish, the object of the invention being to take a mass of fish and subdivide said mass into fractional portions thereof and finally to lay said fish, one by one, in a series of rows upon a screen known as a "fish flake" in order that the fish may be automatically and evenly spread upon said fish flake over the entire surface thereof. Fish flakes, as is well known to those skilled in the art, consist of a frame with a reticulated central portion of coarse net work. Fish are spread out as evenly as possible upon this screen and the flakes with the fish on them are then ordinarily placed in racks in order that the fish may be dried preparatory to being packed in cans. These fish flakes are ordinarily of a width which takes six rows of fish, said flakes being preferably of the same length and width. It is desirable also, in a machine of the class set forth, that the fish should be thoroughly washed before being spread upon the flakes.

To these ends my invention consists in the combination and arrangement of parts set forth in the following specification and particularly pointed out in the claims thereof.

Figure 1:
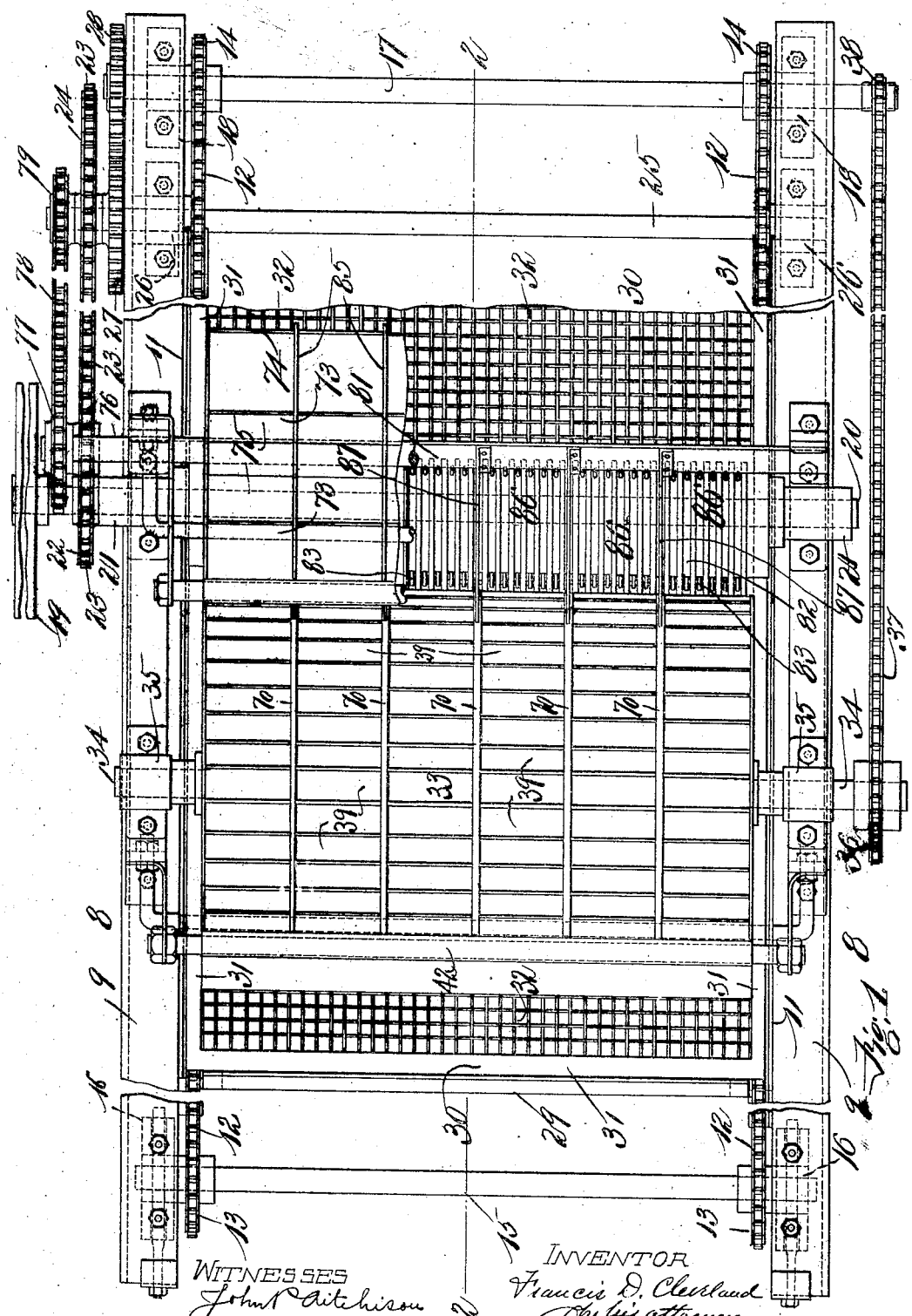
Figure 2:
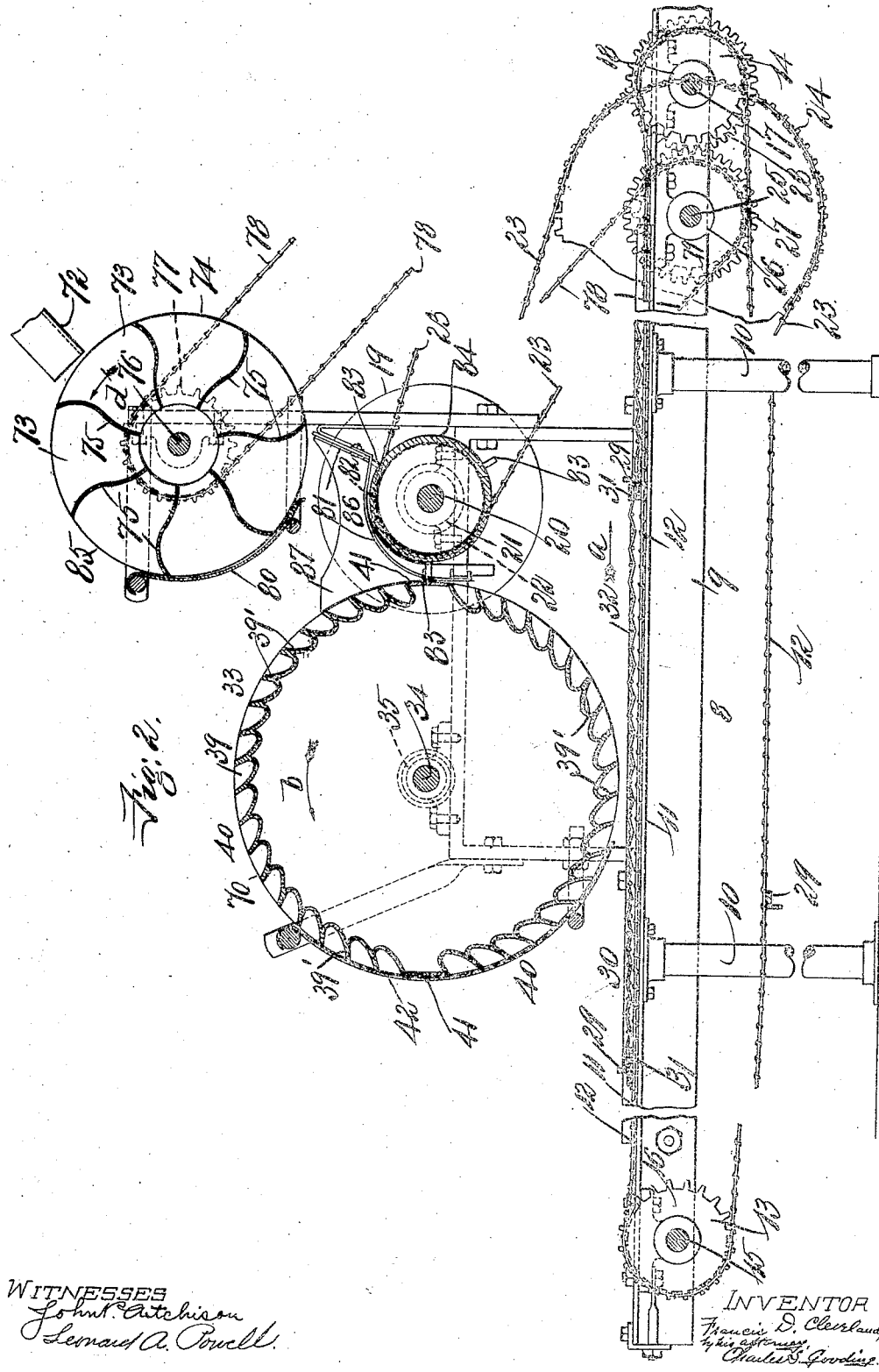

Referring to the drawings: Figure 1 is a plan view of my improved machine for flaking fish, the same being broken away to save space and for the sake of clearer illustration. Fig. 2 is a sectional elevation taken on line 2—2 of Fig. 1. Fig. 3 is a side elevation, partly in section and broken away to save space, of a fish elevator and separator. Fig. 4 is a plan view of the separator illustrated in Fig. 3. Fig. 5 is a sectional elevation taken on line 5—5 of Fig. 4. Fig. 6 is a section taken on line 6—6 of Fig. 3.

Like numerals refer to like parts throughout the several views of the drawings.

In the drawings, referring to Figs. 1 and 2, 8 is a frame consisting of side frames 9, 9. Said frame is supported upon suitable standards 10, 10. Angle irons 11, 11 are fastened to the inner sides of the side frames 9, 9 and constitute guides and supports for the endless chain conveyers 12, 12. These endless conveyers 12, 12 extend around sprockets 13, 13 and 14, 14. The sprockets 13, 13 are fast to a shaft 15 journaled in bearings 16, 16 on the frame of the machine and the sprockets 14 are fast to a shaft 17 journaled in bearings 18 on the frame of the machine. A rotary motion is imparted to the shaft 17 by a pulley 19 fast to a shaft 20 journaled in bearings 21, 21 on the frame of the machine. The shaft 20 has a sprocket gear 22 fast thereto which is connected by a sprocket chain 23 to a sprocket gear 24, said sprocket gear, in turn, being fastened to a shaft 25 journaled to rotate in bearings 26 on the frame of the machine and having a spur gear 27 fast thereto and meshing into a spur gear 28 fast to the shaft 17. Thus the shaft 17 is rotated by the pulley 19, sprocket gear 22, sprocket chain 23, sprocket gear 24 and spur gears 27 and 28. The sprocket chains 12, 12 are connected together by bars 29, 29, preferably formed of angle iron and extending transversely of the conveyer chains 12, 12. These bars are placed at distances apart substantially equal to the length of the "flakes" 30, 30 and act as pushers to push said flakes along the frame in the direction of the arrow *a* (Fig. 2), said flakes being guided between the angle irons 11, 11 against movement transversely of the frame. The flakes 30 are made in the usual manner and consist of a frame 31 and a reticulated central portion 32 of netting. Immediately above the flake frame is located a rotary carrier 33 by which the fish are deposited upon the flake as it is being carried therebeneath. This carrier 33 is fastened to a shaft 34 journaled in bearings 35, 35 upon the frame of the machine and is rotated by means of a sprocket gear 36 fast to the shaft 34 and connected by a sprocket chain 37 to a sprocket pinion 38 fast to the shaft 17. The carrier 33 is provided with a plurality of pockets 39, 39 in its periphery, said pockets being preferably adapted to contain one fish only and being U-shaped in cross-section with their opposite sides 39′, 39′ inclined to the periphery of said carrier and in the direction of rotation of said carrier. Each of the pockets 39 extends transversely of the path of motion of the carrier and said pockets are arranged in a plurality of series, said series, in the present instance, extending around the periphery of said carrier in groups of two and being arranged side by side in groups of six. The length of one series of pockets 40, measured circumferentially of the carrier, is substantially equal to the length of the reticulated central portion of one of the flakes 30 between the end frames 31, 31 thereof, and between the two circumferentially arranged series 40, 40 on the carrier 33 (see Fig. 2) and adjacent to the opposite ends of each of said series, respectively, are two spaces 41, 41 in the periphery of the carrier without pockets and which are substantially equal in length to the space occupied by the ends of two of the flake frames measured transversely thereof and the vertical flange of the angle iron pusher 29, these spaces 41, 41 in the periphery of the carrier being provided to aline with the end portions of the flake frame as they pass beneath the carrier, so that the fish are deposited upon the reticulated portion of the flakes only. A shield 42 extends around a portion of the periphery of the rotary carrier 33 and terminates at its lower end adjacent to one of the flakes 30. This shield prevents fish from falling out of the pockets 39 as the same pass downwardly until said pockets arrive at the lower end of the shield, when the fish is pushed along the shield to the lower end thereof and drops out of the pocket off of the shield and onto the flake 30 which is located immediately therebeneath. The fish are taken from a mass of fish and subdivided into fractional portions thereof and then, by means hereinafter described, are separated so that eventually they are fed into the pockets of each series of circumferential pockets one by one. The mechanism and means for thus separating and segregating the fish from the mass of fish until they are fed one by one to the pockets in the periphery of the carrier and to the pockets in each of the series of pockets in the periphery of said carrier will now be described.

Referring to Figs. 3, 4 and 5, but particularly to Fig. 3, the fish in mass pass down an inclined chute 43 into a receptacle known as a "boot" 44 for the elevator 45. The fish are floated down the inclined chute 43 in a stream of water supplied by suitable pipes 88 and this water enters the boot 44, together with the fish, and thoroughly washes said fish, the water passing out, together with the scales and dirt, through the perforations 46 in the bottom of said boot. The elevator 45 consists of an endless belt or chain 47 with buckets 48 attached thereto which scoop up the fish out of the boot 44 and carry them upwardly in the direction of the arrow c, dump said fish into a chute 49. It will be understood that the buckets 48 thus subdivide the mass of fish which enters the boot 44 into fractional parts thereof. These fractional parts of the original mass of fish are carried by the buckets 48 upwardly in the direction of the arrow c and are dumped at regular intervals and in substantially equal amounts into the chute 49 which guides the fish into a separator 50, the object of the separator being to subdivide the fractional portions of the original mass of fish which are carried by the buckets and dumped into the chute 49, as hereinbefore described, into other fractional portions in equal amounts, to be guided by a plurality of conductors to mechanism which will feed the fish to each of the series of circumferential pockets on the rotary carrier. The separator 50 consists of a stationary cylindrical casing 51 having a plurality of outlet pipes 52, 52, in this case six, broken away to save space in the drawings, these outlet pipes opening out of the bottom of the cylindrical casing 51 and being divided from each other by V-shaped guide plates 53', 53' in the bottom of the casing 51. Concentric with the casing 51 is a shaft 53 journaled at its upper end in a bearing 54 fast to a supporting timber 55. A rotary motion is imparted to the shaft 53 by a bevel gear 56 fast thereto and meshing into another bevel gear 57 driven by a pulley 58. The pulley 58 is fast to a shaft 59 and said shaft has fastened to it another pulley 60 which drives a belt 61, whereby a pulley 62, fast to a shaft 63, is rotated. The shaft 63 has a pulley 64 fast thereto which drives the belt 47, said belt 47, in turn, driving a pulley 65 fast to a shaft 66. The shaft 63 is journaled in bearings 67 supported upon the beam 55, and the shaft 66 is journaled upon standards 68 fast to the floor. To the lower end of the shaft 53 is fastened an elbow 69. The chute 49 delivers fish into the upper end of the elbow 69 and said elbow constitutes an inlet passage for the fish. The fish are delivered from the lower end of the elbow to the upper ends of the pipes 52, 52, said pipes constituting outlet passages from the casing. Thus the fish is subdivided, as hereinbefore described, into substantially equal fractional portions of the original mass of fish delivered by the elevator 45, and these fractional portions of the original mass of fish are delivered in equal time and substantially equal quantities to the separator 50 which then, by the rotation of the elbow 69 into which the fish are delivered, still further subdivides the fish in substantially equal quantities and delivers them to a plurality of guides or conductors 52, 52. In this case the number of these guides is six, being the same number as the number of divisions into which the carrier 33 is divided longitudinally thereof—that is, said carrier is divided by partitions 70, 70 into six divisions. Each of these divisions, as hereinbefore set forth and as clearly shown in Fig. 2, is divided into two series of pockets, so that the series of pockets which extend circumferentially around the periphery of the carrier side by side and are separated from each other by partitions 70, 70 are also each subdivided into two series of circumferential pockets which are divided from each other by the spaces 41, 41 on the periphery of the carrier adjacent to the opposite ends of said circumferential series. The fish in each of the pipes 52, 52 now pass down said pipes, aided by streams of water delivered thereto by suitable pipes 71 (Fig. 3), into chutes 72, which are preferably U-shaped in cross section, and are delivered from said chutes 72 into pockets 73 in a rotary segregator 74. This segregator 74 has a series of pockets 73, 73 opening out of its periphery, the pockets having radially disposed walls 75, 75 of ogee curvature separating one from the other. The segregator 74 is fastened to a shaft 76 journaled to rotate in bearings on the frame of the machine and has a sprocket gear 77 fast thereto and rotated by a chain 78, said chain 78 being actuated by a sprocket gear 79 fast to the shaft 25. The segregator 74 has a shield 80 extending partly around the periphery thereof and terminating near the bottom of said segregator, said segregator being rotated in the direction of the arrow $d$ (Fig. 2). The fish are delivered from the pockets 73 substantially one by one to a guide 81 which is slotted at 82, in order that fingers 83, 83 may pass through said slots and push the fish which rest thereon along the guide 81 and into the pockets 39 of the carrier 33. Immediately beneath the slotted portion of the guide 81 is a rotary feed member 84, said slotted portion of the guide being eccentric to said feed member. The rotary feed member 84 is fast to the shaft 20 and is rotated thereby. As will be seen by reference to Fig. 1, there is, in effect, a segregator 74 for each of the double circumferential series of pockets in the carrier 33—that is, the segregator 74, as a whole, is divided by partitions 85 into six series of pockets 73, so that the fish, as they are delivered to this segregator, are carried around in the direction of the arrow $d$ and dropped out of the pockets 73 one by one onto the guide 81 and are carried by the guide fingers 83 along the curved portion of the guide 81 and delivered one by one into pockets 39 of the carrier 33. The guide 81, it will also be noted, is divided into a series of chambers 86 by partitions 87, 87. The number of chambers 86, the number of circumferential series of pockets 73 and the number of double series of circumferential pockets 39 is six in each case.

The general operation of the mechanism hereinbefore specifically and to some extent in general described is as follows: The fish in mass are carried along the chute 43 by streams of water issuing through suitably arranged pipes 88 and descend and are delivered into the boot 44 at the bottom of the elevator 45. This boot is supplied with water and the fish are pushed around through the water and washed thereby, by the buckets 48 on the elevator 45. The water, together with the dirt, scales and blood from the fish, passes out through the perforations 46 and the fish having thus been washed are carried up by the buckets 48 on the belt 47 in the direction of the arrow $c$ (Fig. 5), and are dumped at equal intervals of time and in substantially equal quantities into a chute 49 which delivers the fish into the rotating elbow 69 constituting the inlet passage of the separator 50. Fish pass downwardly through the elbow from the upper end thereof and are delivered from the lower end of said elbow into the casing 51 of the separator 50. As the elbow revolves rapidly the fish pass out through and are equally divided among the plurality of pipes 52 constituting outlet passages for said separator and from the pipes 52 they pass along chutes 72, aided by streams of water from the pipes 71, to the segregator 74. The segregator 74 has, as before described, a series of pockets therein equal to the number of chutes 72— that is, each of the chutes 72 delivers to one of the series of pockets 73 in the segregator 74. The segregator 74 carries the fish around in the direction of the arrow $d$ (Fig. 2). As the fish are delivered to the segregator 74 they will fall into the pockets 73 from the chutes 72 and are carried around in the direction of the arrow $d$ (see Fig. 2), as before stated. The ogee shape of the dividing walls of the segregator assists in turning the fish from a position radially of the segregator to a position extending longitudinally thereof and the fish, as the segregator rotates, are disposed longitudinally of the pockets 73 and of the segregator 74. As the rotation of the segregator 74 continues, the fish gradually slip down the ogee-shaped walls 75 and rest against the inner face of the shield 80; then being pushed along said shield by the partition walls 75 they drop off of said shield downwardly upon the guide 81 and are pushed sidewise, one by one by the fingers 83 on the rotary member 84 into the pockets 39 on the carrier 33. It will be seen that as the slotted portion of the guide 81 is eccentric to the rotary member 84 the fingers 83 will at first contact with the fish on the slotted portion of the guide 81 and will push them along said guide and gradually be withdrawn from contact with said fish, on account of the eccentric formation of the slotted portion of said guide, and the fish will then slide down the curved portion of the guide 81 into the pockets 39. Thus each of the pockets 39 of the rotary carrier 33 will have a fish deposited therein and these fish will be carried around by the rotation of the carrier in the direction of the arrow $b$ (Fig. 2) inside the shield 42 and will be pushed by the walls of the pockets 39 off of the shield 42 and onto the flake 30, said flanke moving in the direction of the arrow $a$, which is in the same general direction as that of the pockets which are adjacent to said flake, so that the fish when they are delivered from the carrier move in the same direction with the flake as that in which they were being carried by the carrier when it delivered them to said flake. The flakes are placed upon the frames 9, 9 in position to be carried along by the transverse pusher bars 29, 29 by an attendant and when they have passed beneath the carrier and are covered with fish they are removed from the machine by an attendant and placed in racks to be dried.

It will be seen that the chutes 72, the segregator 74 and the guides 81 constitute not only a means for separating the fish and presenting them one by one to the carrier 33, but also constitute a guiding means to guide the fish from the outlet pipes 52 to the pockets 39 in the carrier 33.

It will be evident that while it is preferable to have the carrier 33 divided into series of pockets longitudinally thereof by means of the partitions 70, 70, yet these partitions may be omitted and still produce a useful structure without departing from the spirit of my invention, so long as the fish are separated into fractional portions from the original mass and directed into suitable guiding means whereby they are finally delivered by a plurality of delivery chutes or guides to the periphery of the carrier at different points, respectively, longitudinally of said carrier.

Having thus described my invention, what I claim and desire by Letters Patent to secure is:

1. A machine for flaking fish having, in combination, a rotary carrier with a series of pockets in its periphery, each of said pockets extending transversely of the path of motion of said carrier, means to feed fish into said pockets, a substantial portion of the periphery of said carrier adjacent to the opposite ends of said series being substantially flush with the outer edges of said pockets, a series of independent fish flakes and mechanism adapted to move said flakes successively beneath and adjacent to the periphery of said carrier.

2. A machine for flaking fish having, in combination, a rotary carrier with a plurality of series of pockets in its periphery, the pockets in each of said series extending transversely of the path of motion of said carrier and adapted to contain one fish only, means to feed fish one by one into said pockets, a series of independent fish flakes each common to said plurality of series of pockets and an endless conveyer adapted to move said flakes successively beneath and adjacent to the periphery of said carrier.

3. A machine for flaking fish having, in combination, a rotary carrier with a series of pockets in its periphery, each of said pockets extending transversely of the path of motion of said carrier, a series of independent flakes, each flake consisting of a frame and a reticulated central portion, the length of said reticulated portion being substantially equal to the length of said series of pockets measured circumferentially of said carrier, a substantial portion of the periphery of said carrier adjacent to the opposite ends of said series of pockets being substantially flush with the outer edges of said pockets, and mechanism adapted to move said flakes successively beneath and adjacent to the periphery of said carrier.

4. A machine for flaking fish having, in combination, a rotary carrier, with a plurality of series of pockets in its periphery, each of said pockets extending transversely of the path of motion of said carrier and adapted to contain one fish only, said series extending around the periphery of said carrier side by side, means adapted to divide a mass of fish into fractional portions thereof and means adapted to guide said fractional portions to said carrier and deliver them to said pockets at different points longitudinally of said carrier, a fish flake common to said plurality of series of pockets and mechanism adapted to move said flake beneath and adjacent to the periphery of said carrier.

5. A machine for flaking fish having, in combination, a rotary carrier with a plurality of series of pockets in its periphery, each of said pockets extending transversely of the path of motion of said carrier and adapted to contain fish, said series extending around the periphery of said carrier side by side, means adapted to divide a mass of fish into fractional portions thereof and means adapted to guide said fractional portions to said carrier and deliver them to said pockets at different points longitudinally of said carrier, a fish flake consisting of a frame and a reticulated central portion, said reticulated portion extending across said series of pockets and mechanism adapted to move said flake beneath and adjacent to the periphery of said carrier.

6. A machine for flaking fish having, in combination, a rotary carrier with a plurality of series of pockets in its periphery, each of said pockets extending transversely of the path of motion of said carrier, said series extending around the periphery of said carrier side by side, a substantial portion of the periphery of said carrier adjacent to the opposite ends of each of said series, respectively, being substantially flush with the outer edges of said pockets, a fish flake consisting of a frame and a reticulated central portion, said reticulated portion extending across said series of pockets and being of a length substantially equal to the length of one of said series measured circumferentially of the periphery of said carrier, means adapted to divide a mass of fish into fractional portions thereof and means adapted to guide said fractional portions to said carrier and deliver them to said pockets at different points longitudinally of said carrier, and mechanism adapted to move said fish flake beneath and adjacent to the periphery of said carrier.

7. A machine for flaking fish having, in combination, a rotary carrier with a series of pockets in its periphery, each of said pockets extending transversely of the path of motion of said carrier and adapted to contain one fish only, mechanism adapted to rotate said carrier in a given direction, said pockets being U-shaped in cross section with their opposite sides inclined to the periphery of said carrier and inclined in the direction of rotation of said carrier, a fish flake, mechanism adapted to move said flake beneath and adjacent to the periphery of said carrier in the general direction of the inclination of the sides of said pockets at the delivery point and a shield adjacent to and extending around a portion of the periphery of said rotary carrier and terminating at one end thereof adjacent to said flake.

8. A machine for flaking fish having, in combination, a rotary carrier with a series of pockets in its periphery, each of said pockets extending transversely of the path of motion of said carrier and adapted to contain fish, mechanism adapted to rotate said carrier, a fish flake, mechanism adapted to move said fish flake beneath and adjacent to the periphery of said carrier, a shield adjacent to and extending around a portion of the periphery of said carrier and terminating at one end thereof adjacent to said flake, a rotary segregator having a series of pockets in its periphery adapted to receive fish, means to deliver fish into said pockets, a shield adjacent to and extending part way around the periphery of said segregator and terminating at one end thereof near the bottom of said segregator, a guide interposed between said segregator and carrier and adapted to guide fish from said segregator to the pockets in said carrier and means independent of said segregator to push said fish along said guide into said pockets.

9. A machine for flaking fish having, in combination, a rotary carrier with a series of pockets in its periphery, each of said pockets extending transversely of the path of motion of said carrier and adapted to contain fish, mechanism adapted to rotate said carrier, a fish flake, mechanism adapted to move said fish flake beneath and adjacent to the periphery of said carrier, a shield adjacent to and extending around a portion of the periphery of said carrier and terminating at one end thereof adjacent to said flake, a rotary segregator having a series of pockets in its periphery adapted to receive fish, means to deliver fish into said pockets, a shield adjacent to and extending part way around the periphery of said segregator and terminating at one end thereof near the bottom of said segregator, a guide interposed between said segregator and carrier and adapted to guide fish from said segregator to the pockets in said carrier and a rotary feed member located beneath said guide and provided with fingers adapted to project through slots in said guide and engage fish therein to push said fish along said guide and into the pockets in said carrier.

10. A machine for flaking fish having, in combination, a rotary carrier with a series of pockets in its periphery, each of said pockets extending transversely of the path of motion of said carrier and adapted to contain fish, mechanism adapted to rotate said carrier, a fish flake, mechanism adapted to move said fish flake beneath and adjacent to the periphery of said carrier, a shield adjacent to and extending around a portion of the periphery of said carrier and terminating at one end thereof adjacent to said flake, a rotary segregator having a series of pockets in its periphery adapted to receive fish, means to deliver fish into said pockets, a shield adjacent to and extending part way around the periphery of said segregator and terminating at one end thereof near the bottom of said segregator, a guide interposed between said segregator and carrier and adapted to guide fish from said segregator to the pockets in said carrier and a rotary feed member located beneath said guide and provided with fingers adapted to project through slots in said guide and engage fish therein to push said fish along said guide and into the pockets in said carrier, said guide being eccentric to the periphery of said feed member.

11. A machine for flaking fish having, in combination, a rotary carrier with a series of pockets in its periphery, each of said pockets extending transversely of the path of motion of said carrier and adapted to contain fish, mechanism adapted to rotate said carrier, a fish flake, mechanism adapted to move said fish flake beneath and adjacent to the periphery of said carrier, a shield adjacent to and extending around a portion of the periphery of said carrier and terminating at one end thereof adjacent to said flake, a rotary segregator having a series of pockets in its periphery adapted to receive fish, radially disposed walls of an ogee curvature separating said pockets from each other, means to deliver fish into said pockets, a shield adjacent to and extending part way around the periphery of said segregator and terminating at one end thereof near the bottom of said segregator, a guide interposed between said segregator and carrier and adapted to guide fish from said segregator to the pockets in said carrier and means to push said fish along said guide into said pockets.

12. In a machine for handling fish, a rotary segregator having a series of pockets in its periphery adapted to receive fish, radially disposed walls of an ogee curvature separating said pockets from each other and means to deliver fish into said pockets.

13. In a machine for handling fish, a rotary segregator having a series of pockets in its periphery adapted to receive fish, radially disposed walls of an ogee curvature separating said pockets from each other, means to deliver fish into said pockets and a shield adjacent to and extending part way around the periphery of said segregator and terminating at one end thereof near the bottom of said segregator.

14. A machine for flaking fish, having, in combination, a carrier, said carrier having a plurality of pockets in its periphery adapted to contain fish, a fish flake, mechanism adapted to move said fish flake beneath and adjacent to the periphery of said carrier, means adapted to divide a mass of fish into fractional portions thereof and means adapted to guide said fractional portions to said carrier and deliver them to said pockets at different points longitudinally of said carrier.

In testimony whereof I have hereunto set my hand in presence of two subscribing witnesses.

FRANCIS D. CLEVELAND.

Witnesses:
CHARLES S. GOODING,
SYDNEY E. TAFT.